United States Patent Office 2,773,382
Patented Dec. 11, 1956

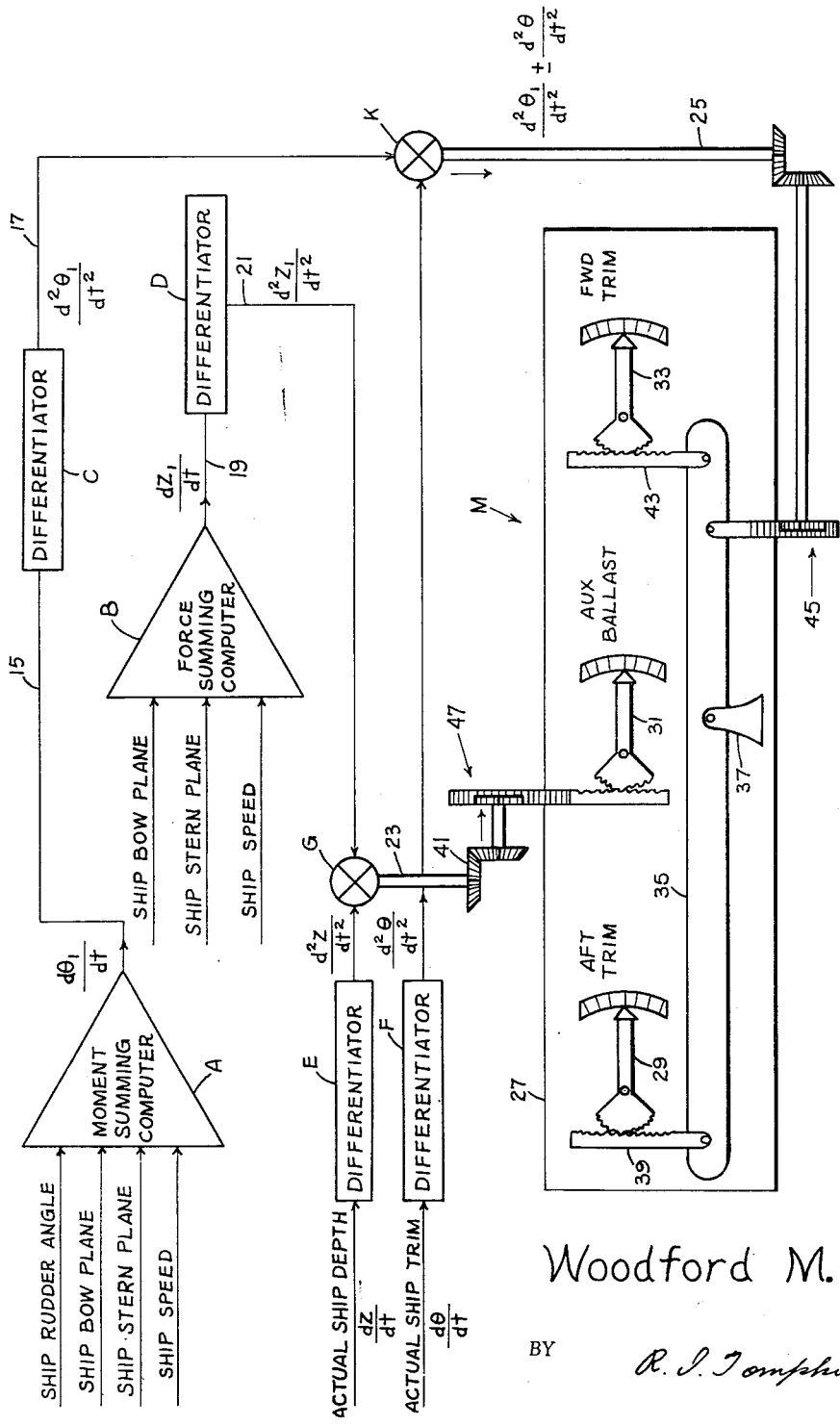

2,773,382

SUBMARINE TRIM INDICATOR

Woodford M. Rand, Hicksville, N. Y.

Application July 3, 1952, Serial No. 297,192

2 Claims. (Cl. 73—178)

(Granted under Title 35, U. S. Code (1952), sec. 266)

The invention described herein may be manufactured and used by or for the Government of the United States of America for governmental purposes without the payment of any royalties thereon or therefor.

The invention relates in general to a submarine trim indicator, and more particularly to a means and method for indicating whether the trim controls are in proper position to effect a desired trim condition of the submarine boat.

The diving officer aboard a submarine is responsible for determining the control settings which will provide the proper trim. The diving and pitch of the boat are controlled by a bow plane, a stern plane and a rudder. The various angular positions of these elements will determine to a great extent whether the submarine will dive, rise, turn, or maintain a level position.

In addition to these controls, a certain amount of balance or trim is necessary in order that the boat will maintain a properly balanced or normally horizontal position in the water when submerged. For this purpose trim tanks are provided. Usually three are employed, one forward tank, one after tank and one auxiliary ballast tank located near the center of the submarine. By actuating certain valves, water may be transferred from any one tank to any other tank or into the sea. Sea water may be taken into the tanks also. The relative amounts of water in the forward and after tanks will generally govern the trim angle of the submarine. This angle may be termed the angle between the longitudinal axis of the submarine and a horizontal line tangent to the earth's surface at the submarine's location. Due to displacements of weight such as fuel, supplies and personnel within the submarine, water must be transferred between the forward and after tanks in order to maintain a balance and prevent rotation about the transverse horizontal axis of the boat. Movement of water in and out of the auxiliary tank will increase or decrease the relative weight of the submarine and produce a tendency to sink or rise.

At the present time, the only instruments available to the diving officer for dynamic trim analysis are of a qualitative nature; the depth gauge, the inclinometer, and the plane order indicators. The responsibility rests with the diving officer to arrive at quantitative conclusions relative to trim state after making an analysis of the reaction of the above qualitative trim instruments. The only quantitative trim instrument available at the present time is the bathythermograph, which is of limited value in trim adjustment unless the submarine is in trim initially.

There are two methods of trim analysis currently utilized by diving officers; the static method and the dynamic method. Static trimming is accomplished by awaiting a situation during which the submarine boat is not changing its depth or trim angle. At that time, trim adjustment is made based on an analysis of the amounts of plane angle and trim angle required to maintain a constant value of depth. The static system is practiced in varying forms of effectiveness ranging between the trial and error stage and the precision stage, depending upon the skill and experience of the individual diving officer.

The dynamic trim method is an advanced method of trimming practiced successfully only by experienced diving officers. This method is independent of submarine fixed depth, and is accomplished by analyzing the rates of change of depth and trim angle. In this process the officer performs a mental analysis which amounts to a double differential comparison. The first step is to observe the actual rate of change in trim angle and mentally compare it with the rate the officer feels should occur if the submarine were properly trimmed. The second step is to observe the rate of change of depth and mentally compare this with the rate of change of depth which the submarine should have if properly trimmed. These differences in rates of change of depth and trim angle are then mentally converted by the diving officer into terms of the actual amounts of water which should be shifted between the trim tanks to trim the submarine. Diving officers develop the ability to perform this trimming operation rapidly and accurately only after considerable practice and diligent application.

The first step in mechanically reproducing this mental operation is to employ a mechanical computer which, when supplied with the actual values of speed, rudder angle, and plane order, will generate values of depth and trim angle which should obtain if the submarine is in trim. If these output values are fed to speedometer type differentiators, then the differentiator outputs will represent the rates of change of depth and trim angle.

The second step is to feed the respective outputs of a depth sensor and a trim angle sensor to additional speedometer type differentiators to generate actual existing values of depth change rate and trim angle change rate.

If the actual value of depth change rate is algebraically added to the generated or ideal value of depth change rate, the result is proportional to the trim difference caused by the improper trimming of the auxiliary tank.

If F represents the vertical force applied by the auxiliary tank due to its out-of-trim weight, then, F equals $ma$, where $m$ is the mass of the submarine and "$a$" is its acceleration due to the applied force. The symbol "$a$" may be replaced by $$\frac{d^2z}{dt^2}$$

where $z$ represents the measurement of depth along the Y axis. Since the value of $m$ remains constant, $$F = K\frac{d^2z}{dt^2}$$

and F will vary as the depth acceleration.

Similarly, when the actual value of rate of change in trim angle is algebraically added to the generated or ideal value, the result is proportional to the trim difference caused by the forward or after trim tank being improperly trimmed.

If M equals the moment of force applied by a trim tank which is improperly trimmed, then $M = I\Omega$ where I is the moment of inertia of the submarine and $\Omega$ is the angular acceleration of the boat about its transverse horizontal axis.

The symbol $\Omega$ may be replaced by $$\frac{d^2\theta}{dt^2}$$

where $\theta$ represents the angular measurement about the transverse axis known as the trim angle. Then, $$M = I\frac{d^2\theta}{dt^2}$$

Now $M=Fd$ where F represents the force due to out of trim weight in the trim tanks and $d$ represents the distance from the transverse axis at which it is applied. Since $d$ has a constant value and since for all practical operational purposes the value of I may be treated as a constant, it may be stated that $$FK = K\frac{d^2\theta}{dt^2}$$

and F will vary as the angular acceleration of the submarine about its transverse axis.

One of the objects of the present invention is to provide a device which will detect trim differences automatically and thus permit the diving officer to give less attention to trim analysis.

Another object of the invention is to reduce the guesswork and possibility of error in operation by providing positive and accurate indications which eliminate the necessity of making mental analyses.

Another object of the invention is the provision of an automatic indicator which may be used by relatively inexperienced personnel to accomplish results which were formerly obtainable only by highly capable and experienced individuals.

Another object of the invention is the provision of a composite indicator which will show at a glance whether the actual trim condition of the submarine coincides with the ideal or proper trim condition.

Other objects and many of the attendant advantages of this invention will be readily appreciated as the same becomes better understood by reference to the following detailed description when considered in connection with the accompanying drawings wherein:

The single figure of the drawing shows the preferred embodiment of the invention.

In this figure the ideal or generated values of trim angle and depth are produced at the summing devices A and B. Actual values of the submarine speed, rudder angle, bow plane angle and stern plane angle are derived from any existing operational equipment on board the submarine and are resolved into moment and force values by any conventional resolver to provide moment values of rudder angle, bow plane angle, stern plane angle and submarine speed. The values may be introduced into the summing devices by means of shafts connected to the corresponding operational equipment of the submarine in the case of a mechanical summing device or by means of voltages regulated from potentiometers actuated by the movement of the submarine equipment in the case of an electronic summing device. The specific structure of the submarine elements is not shown because these elements are conventional and well known to those in the submarine art. The moment values are added at A by any conventional electrical summing amplifier or mechanical differential. These values may be introduced either in the form of voltages in the case of an electrical device or in the form of shaft rotation for a mechanical summarizer. The detailed construction of the summing devices A and B has not been disclosed because such devices are well known in the art and the internal specific structures are not claimed as a part of the present invention. Numerous types of mechanical summing devices are old and well known. It is common in the art to employ levers, pulleys, racks and pinions, pressure systems, differential selsyns and mechanical or geared differentials for summing up values. The use of electrical summation devices wherein voltages are introduced into a summing amplifier and the final value is in the form of a shaft rotation is shown in the patent granted to R. C. Dehmel No. 2,471,315 dated May 24, 1949. Fig. 5 of the patent shows a typical summing amplifier circuit and Fig. 2 shows these summing means connected to actuate motors to give a shaft output which is the sum of the amplifier inputs. A well known summing circuit is also shown in Patent No. 2,401,779 to Swartzel dated June 11, 1946. Many uses of electronic summing circuits to give a summation in the form of shaft outputs are shown in patents such as Reissue No. 23,627 to R. C. Dehmel dated March 10, 1953, Patent No. 2,460,743 to C. E. Germanton dated February 1, 1949, Patent No. 2,628,434 to R. C. Dehmel dated February 17, 1953, and Patent Number 2,529,468 to R. C. Dehmel dated November 7, 1950. Various other summing devices of a mechanical construction are shown in Figs. 269 through 281 in volume II and described on pages 183 to 190 in volume I of the publication Analysis and Design of Translator Chains by H. Ziebolz, copyrighted September 25, 1946 by Askania Regulator Company. Figure 271 discloses a summing device in the form of a mechanical differential, with the added or summed up value in the form of a shaft rotation output. Additional illustrations and descriptive material which disclose mechanical differentials for adding values appear on pages 6 to 11 of the book entitled Computing Mechanisms and Linkages by Antonin Svoboda, copyrighted in 1948 by McGraw-Hill Book Company. This book is No. 27 of the Radiation Laboratory Series of the Massachussetts Institute of Technology. The output $$\frac{d\theta_1}{dt}$$

of the moment summing computer A is in the form of a shaft 15 which rotates at a speed proportional to the value of the trim angle $\theta$. This shaft rotation is fed into a differentiator C which may be in the form of a conventional speedometer to provide an output $$\frac{d^2\theta_1}{dt^2}$$

at 17 which changes with a corresponding change in speed of rotation of shaft 15. In other words, the angular position of shaft 17 will not change so long as shaft 15 rotates at a constant speed and the angular position of shaft 17 increases in proportion to the increase in speed of the shaft 15. The shaft 17 is connected to a mechanical differential K. Various mechanisms for converting shaft rotation to shaft position are well known in the art, and the details of such mechanisms form no part of the present invention. It is common in speedometers and tachometers to employ various devices which will receive an input in the form of speed-of-rotation of a shaft and convert this to an output in the form of an angular position of a shaft or pointer, the angular position varying in degree with the speed of rotation of the input shaft. Such well known devices as the centrifugal tachometer, the magnetic tachometer, the electric tachometer, and the chronometric tachometer are shown and described on pages 96 to 139 of the book by George Ellis Irvin entitled Aircraft Instruments, copyrighted in 1941 by McGraw-Hill Book Company.

The force values of bow plane angle, stern plane angle and submarine speed are added at B. The combined values $$\frac{dz_1}{dt}$$

are fed into differentiator D by shaft 19, the output $$\frac{d^2z_1}{dt^2}$$

of which is introduced at 21 into differential G in the manner described above. The only factors which produce a force to increase or decrease the submarine depth are the ship planes and the speed, because the rudder does not affect depth. The speed and the positions of the planes determine the force acting on the submarine to make it submerge fast or slow as the case may be. For this reason, only three values are introduced into the computer B. However, the entire submarine trim includes the rudder angle factor also. Therefore, the computer A requires four inputs. The values introduced into computer B may be derived in the same manner as those for computer A, and the specific mechanism for measuring these inputs for introduction into the computer forms no part of the claimed invention.

The two differentials G and K also receive inputs of actual existing values of submarine depth and trim which are added to and compared with the synthetic values generated at A and B to provide output shaft positions 23 and 25 indicative of plus or minus differences between actual and synthetic values.

The existing values of the submarine depth $$\frac{dz}{dt}$$

and trim angle $$\frac{d\theta}{dt}$$

are taken from existing operational equipment such as indicators on the submarine and fed as values $$\frac{d^2z}{dt^2}$$

and $$\frac{d^2\theta}{dt^2}$$

into differentials G and K through differentiators E and F similar to differentiators C and D.

Although it is considered desirable to employ primarily conventional mechanical structures for the summarizers, differentiators and the connections therebetween, it is obvious that the various devices which produce the input values for the differentials G and K could be electrical in nature, since summing amplifiers, differentiators and voltage resolvers are all well known in the art. Such devices for receiving two or more inputs and combining them to give a summed up output in the form of a shaft rotation have already been referred to in the specification as being disclosed in various patents and publications.

The outputs of the comparing differentials G and K are connected to a trim indicating mechanism M. This mechanism comprises a panel 27 upon which are pivotally mounted three indicators 29, 31 and 33. The connections between the indicators and the differentials G and K are such that all three indicators will be in horizontal alinement or zero reading position when the submarine is in proper trim and the trim tank valves are properly set for the existing speed, rudder angle, bow plane and stern plane positions. This horizontally alined arrangement of all three indicators provides the diving officer with the desired information at one quick glance.

The end indicating pointers are connected directly by means of racks 39 and 43 to a lever arm 35 pivotally mounted on panel 27 at fulcrum 37. The pivot points of the racks are spaced according to the respective locations of the trim tanks on the submarine so that dial 29 indicates after trim and pointer 33 denotes forward trim. The center pointer 31 is connected to the shaft 23 through the medium of gears 41 and rack and pinion 47, and this indicator 31 shows the auxiliary ballast trim condition.

As pointed out above, the various elements are so spaced and connected that a zero indication appears on all three pointers when the outputs from differentiators D and E are equal at differential G and the outputs from differentiators C and F are equal at differential K. A plus or minus variation between theoretic trim angle and actual trim angle will result in movement of pointers 29 and 33. Since pointers 29 and 33 will always move in opposite directions, their positions will indicate which of the forward and after tanks are improperly trimmed. The movement of the pointers is produced by shaft 25 through the rack and pinion 45.

While the relative amounts of water in the forward and after trim tanks generally govern the trim angle of the submarine expressed as the angle θ, the effect of movement of water into or out of the auxiliary tank is to cause an increase or decrease in depth expressed as Z. Therefore, any plus or minus difference between theoretic and actual depth values at differential G will produce a movement of pointer 31 from zero position through shaft 23, gears 41 and rack and pinion 47.

The relative sizes and positions of elements 35, 37, 39, 43 and 45 will vary according to the particular submarine in which the apparatus is mounted.

While the above described apparatus is particularly designed for use as a submarine indicator, it could be employed on any type of craft movable in a fluid medium and employing some form of ballast and forward and rear plane surface controls. Such a device could be well adapted to lighter-than-air craft. The reason for this is that an airship is a movable body suspended in a fluid medium and requires the same type of controls as a submarine which also moves in a fluid medium. Both are elongated bodies which move forward, up or down, right or left, in a fluid medium and both thus require stability or trim which varies with the amount and distribution of ballast or other weight such as fuel.

Obviously many modifications and variations of the present invention are possible in the light of the above teachings. It is therefore to be understood that within the scope of the appended claims the invention may be practiced otherwise than as specifically described.

What is claimed is:

1. A trim characteristics indicator for a submarine provided with variable control devices including bow plane, stern plane, and rudder as well as forward, after and auxiliary trim tanks, comprising a first summing device for adding moment values of rudder angle, plane angles and submarine speed to provide an off-centered total value representing desired trim angle, a second summing device for adding force values of plane angles and submarine speed to provide a total value representing a theoretic depth, means comparing said first and second summing values to those of the actual submarine trim angle and depth, an indicator showing the trim condition of the forward tank, a second indicator showing the trim condition of the after tank, a third indicator showing the condition of the auxiliary tank and means connecting the indicators to said comparing means, said connecting means comprising a pivotally mounted lever arm, means at one end of the arm actuating said first named indicator, means at the other end of the arm actuating the second indicator and actuating means connected to said comparing means for actuating the third indicator.

2. A trim characteristics indicator for a submarine comprising a differential, rotatable means connected to said differential to indicate forward and aft trim, a multiple indicator unit comprising a plurality of spaced indicators and means connecting said first rotatable means with first and second of said indicators whereby the trim differences are detected automatically, said connecting means comprising an off-centered pivoted lever arm, means connecting one end of the arm to said first indicator, and means connecting the other end of the arm to said second indicator to display the difference between the forward and aft trim of the submarine.

(References on following page)

References Cited in the file of this patent

UNITED STATES PATENTS

| | | |
|---|---|---|
| 2,066,949 | Ruiz | Jan. 5, 1937 |
| 2,115,568 | Becker | Apr. 26, 1938 |
| 2,403,542 | Newell | July 9, 1946 |
| 2,539,616 | Oehman | Jan. 30, 1951 |
| 2,579,220 | Vine | Dec. 18, 1951 |

FOREIGN PATENTS

| | | |
|---|---|---|
| 457,413 | France | July 10, 1913 |
| 374,171 | Italy | Aug. 19, 1939 |